(No Model.)

W. MORROW.
FLAX HARVESTER.

No. 480,434. Patented Aug. 9, 1892.

Witnesses
J. Edw. Maybee
W. G. McMillan

Inventor
Wesley Morrow
by Donald G. Ridout & Co
Attys.

UNITED STATES PATENT OFFICE.

WESLEY MORROW, OF MILLBROOK, CANADA.

FLAX-HARVESTER.

SPECIFICATION forming part of Letters Patent No. 480,434, dated August 9, 1892.

Application filed December 3, 1891. Serial No. 413,892. (No model.)

*To all whom it may concern:*

Be it known that I, WESLEY MORROW, of the village of Millbrook, in the county of Durham, in the Province of Ontario, Canada, have invented a certain new and Improved Flax-Harvester, of which the following is a specification.

The object of the invention is to design a simple device by which the entire stalks of the flax are secured; and it consists in the peculiar construction, arrangement, and combinations of parts, hereinafter more particularly described, and then definitely claimed.

Figure 1:
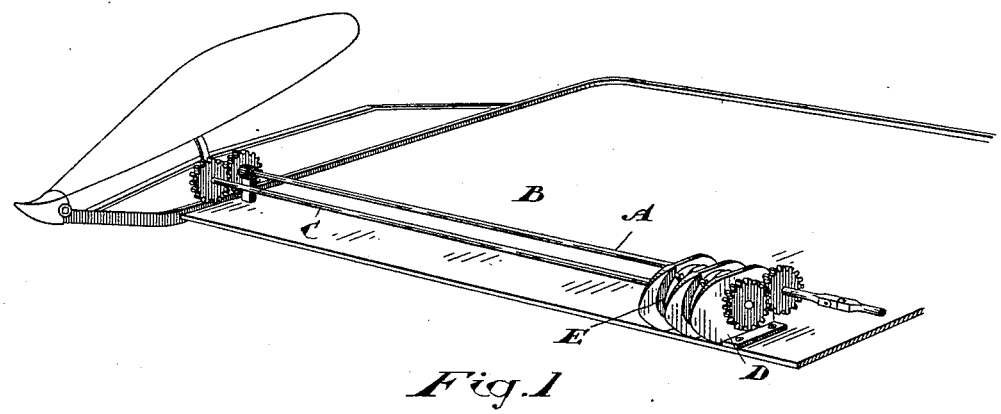
Figure 2:
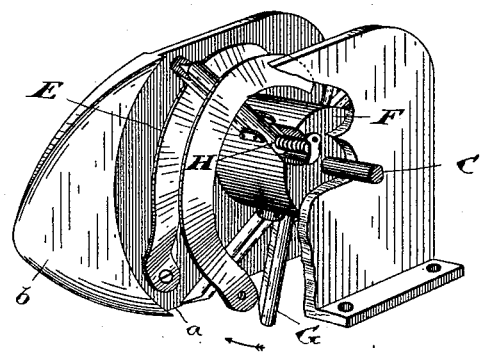

In the accompanying drawings, Figure 1 is a perspective view of my flax-harvesting device applied to the grain-table of a harvester. Fig. 2 is an enlarged detail, partially broken away to expose the construction of my harvesting device.

In the drawings, A is a shaft suitably connected to the driving mechanism of the machine, so that said shaft will revolve when the machine advances. This shaft is suitably supported on the grain-table B and is geared at each end to a parallel shaft C, likewise supported on the grain-table.

A series of brackets D are rigidly fastened to the grain-table B, said brackets projecting beyond the edge of the grain-table and shaped to form dividers to guide the stalks of the flax between them.

Spring-plates E are arranged in pairs and rigidly fastened to the brackets D. These spring-plates are curved inwardly toward each other.

F is a hub rigidly fastened to the shaft C. A series of fingers G are arranged in pairs and independently pivoted on the hub F. These fingers project into the hub F, and each finger is provided with a spring H, designed to act upon the fingers and hold their outer ends apart. When the fingers G are clear of the spring-plates E, their outer ends touch the recessed face $a$ of the brackets D. The front end or nose $b$ of each of the brackets D project above the face $a$. As the harvester advances, the shaft C will revolve and the fingers G travel in the direction indicated by arrow. The flax-stalks are simultaneously guided between the brackets D and between the fingers G. When the flax-stalks enter between the said fingers, they enter between the spring-plates E, which, being curved toward each other, as indicated, force the said fingers together, causing them to grip the flax-stalks with sufficient force to pull the stalks out of the ground, and as the fingers G continue to travel they raise the stalks over onto the table B, at which period the fingers have cleared the spring-plates E, when the springs H, acting on the said fingers, force them apart, thereby causing them to drop the flax, which will fall upon the table B and be carried toward the binder by the traveling canvas.

From this description it will be seen that I have produced a simple device which will effectually harvest flax without wasting any portion of the stalks.

What I claim as my invention is—

The shaft C, supported in suitable bearings on the grain-table B and geared to the driving mechanism of the harvester so as to derive a rotary movement, the fingers G, pivoted in pairs around the shaft C, each finger being actuated by a spring H, in combination with the brackets D, noses $b$, and spring-plates E, substantially as and for the purpose specified.

Milbrook, August 24, 1891.

WESLEY MORROW.

In presence of—
 WILLIAM SHAW,
 JAMES HANDLEY.